June 30, 1964  J. H. AMSTAD  3,138,822
POULTRY PROCESSING METHOD AND APPARATUS
Filed June 4, 1962  3 Sheets-Sheet 1
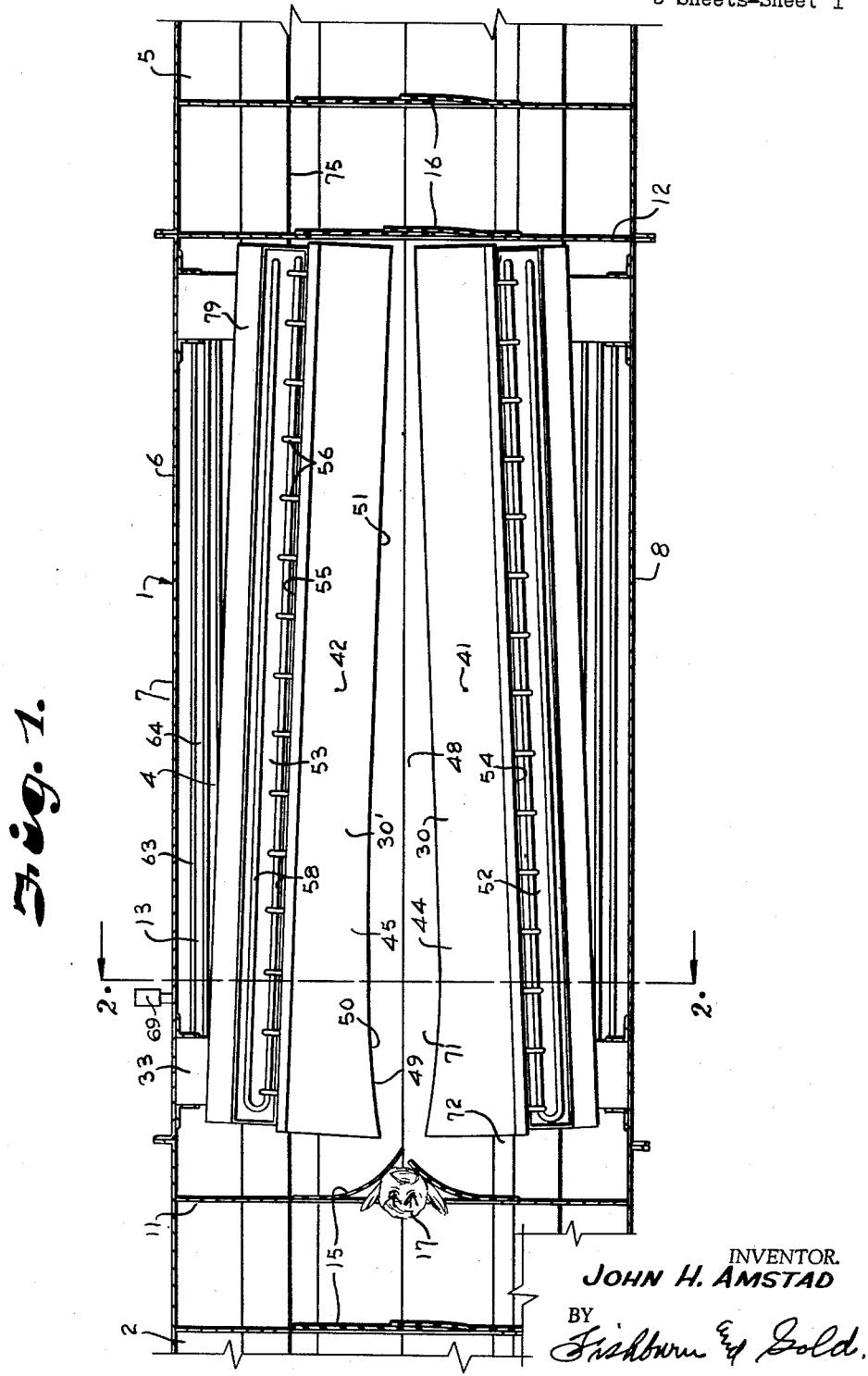
INVENTOR.
JOHN H. AMSTAD
BY
ATTORNEYS

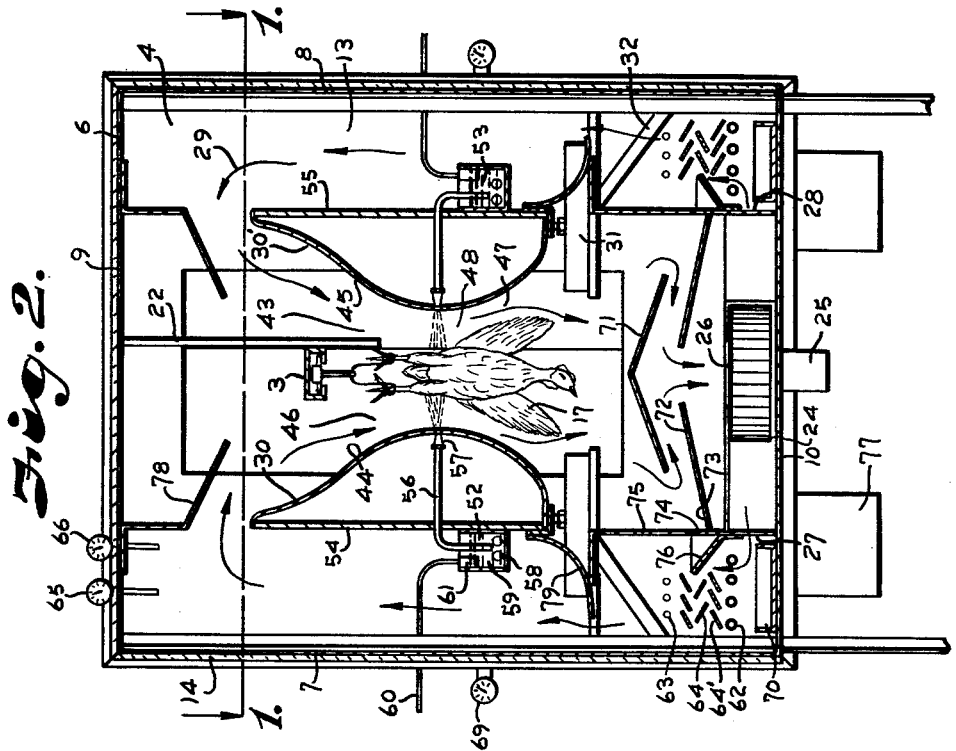
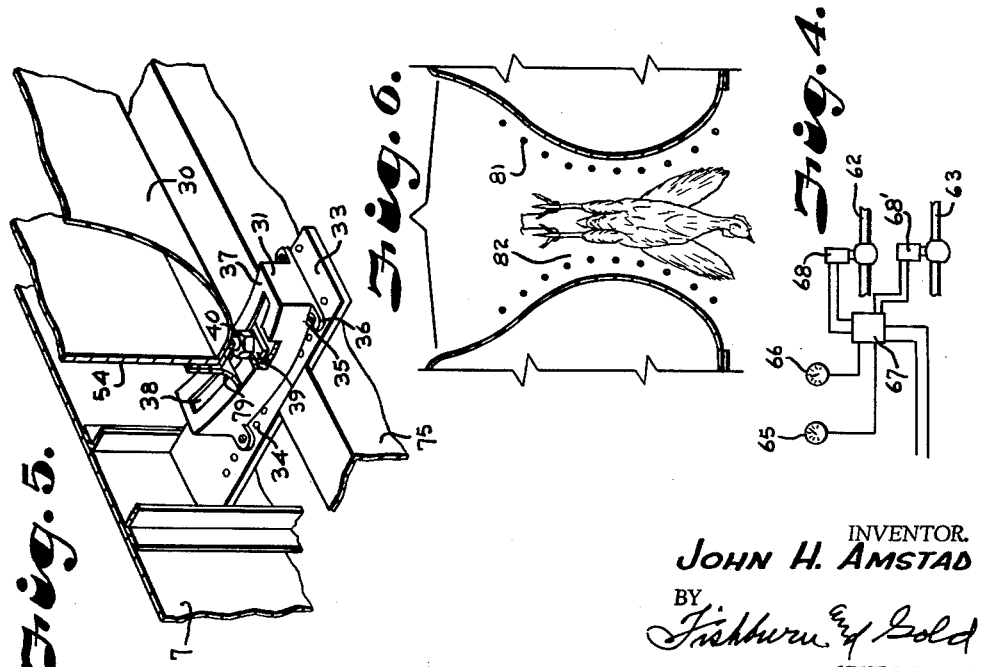

June 30, 1964  J. H. AMSTAD  3,138,822
POULTRY PROCESSING METHOD AND APPARATUS
Filed June 4, 1962  3 Sheets-Sheet 3
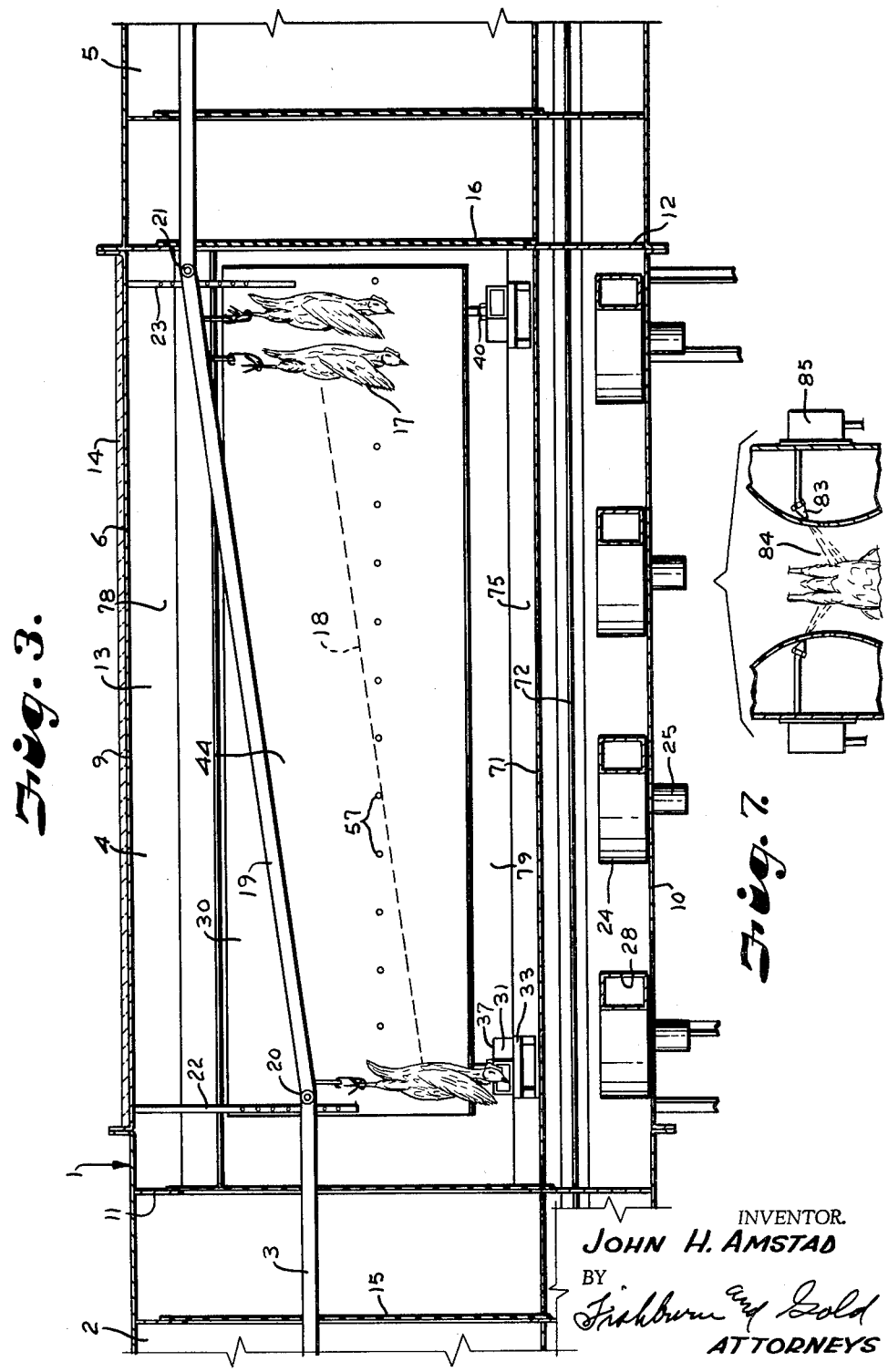
INVENTOR.
JOHN H. AMSTAD
BY
Fishburn and Gold
ATTORNEYS

United States Patent Office 3,138,822
Patented June 30, 1964

3,138,822
POULTRY PROCESSING METHOD AND
APPARATUS
John H. Amstad, 416 N. Court, Ottumwa, Iowa
Filed June 4, 1962, Ser. No. 199,978
12 Claims. (Cl. 17—11.2)

This invention relates to poultry processing, and more particularly to an apparatus and method for conditioning poultry for plucking after slitting the necks thereof.

Poultry as used herein refers to domestic birds, such as chickens, turkeys, ducks, etc.

In order for automatic poultry plucking machines to operate effectively, it is necessary that the skin of the birds be heated adjacent the root of the feathers to promote easy separation. Because a layer of fluffy feathers is located adjacent the skin, controlled, even heating, or in other words, scalding, of the skin is very difficult. Overheating will tend to cause the removal of too much of the epidermis which severely limits the keeping or storage period before spoilage begins. If the skin temperature control, or scalding process, is not uniform, the plucking machine will have difficulty in plucking certain areas of the chicken or will tend to "bark" or damage the skin, also decreasing the period of safe storage and in addition rendering the bird unsightly. The common method of heat treating or scalding poultry in the United States is by total immersion of the birds in tanks of violently agitated water carefully maintained at temperatures between 123 to about 180 degrees F., depending upon the "hardness" of the scald desired. The higher temperature or "harder" scalds improve feather removal but decrease storage qualities and produce a smeary appearance of the skin. Although the total immersion in water and violent agitation produces a uniform scald by mechanically forcing hot fluid through the fluffy feather layer and against the skin surface, the tank scalding method has certain inherent disadvantages. One limitation of the tank scalding method is that the processor must be absolutely certain that the bird has stopped breathing and its heart has stopped beating or contaminated tank water may be aspired into the lungs and/or drawn into the circulation system which will render the bird unfit for consumption. Other limitations of the tank scalding method are that it tends to be highly unsanitary and that it sometimes can physically damage the bird. Also, a tank scald rapidly heats the bird to an abnormally high body temperature which may cause congealing of undrained blood which reduces marketability.

Another major consideration in the efficient processing of poultry is that the bird's body temperature cannot be allowed to fall substantially below normal living temperature for any considerable length of time prior to plucking, or rigor mortis will set in, setting the plumage and rendering the bird very difficult to pluck. Heretofore, during periods of bleeding and plucking, no external heat was applied to the bird and often body temperature would drop to a point where the bird would begin to stiffen before plucking was completed. An additional problem in the processing of poultry is that in a normal room atmosphere the birds tend to cool down and dry out after scalding and while awaiting plucking which reduces the effectiveness of the scald.

The principal objects of the present invention are: to provide a poultry processing method and apparatus which results in easier and more complete feather removal from the birds; to provide a method and apparatus wherein the birds are maintained under improved sanitary conditions during processing; to provide such a method and apparatus wherein proper scalding or skin conditioning is performed rapidly and efficiently; to provide a method and apparatus for conditioning poultry whereby feather removal may be accomplished without producing barking or skin damage; to provide such a method and apparatus whereby skin conditioning for plucking can be efficiently and uniformly performed in a manner which tends to retard spoilage; to provide such a system wherein blood is more positively and rapidly evacuated from the poultry during processing; to provide such an apparatus wherein the atmosphere surrounding the poultry may be maintained in a heated and saturated condition to prevent dehydration and maintain the skin condition for plucking; to provide such an apparatus which is easily adjustable to handle birds of various sizes and types; to provide such a poultry processing apparatus requiring a minimum of liquid for processing; to provide an apparatus and method by which water spray at a controlled temperature is combined with high velocity heated and saturated air to quickly and uniformly condition poultry skin for feather plucking; and to provide such a poultry processing system which rapidly and efficiently processes poultry at low cost.

Other objects and advantages of this invention will become apparent from the following description taken in connection with the accompanying drawings wherein are set forth by way of illustration and example certain embodiments of this invention.

FIG. 1 is a cross-sectional view of poultry processing apparatus embodying this invention, taken on the line 1—1, FIG. 2, and particularly showing an elongated nozzle throat construction.

FIG. 2 is a cross-sectional view in end elevation taken transversely through the apparatus on the line 2—2, FIG. 1, particularly showing the air flow pattern therein.

FIG. 3 is a cross-sectional view through the apparatus in side elevation particularly showing one side of the nozzle construction.

FIG. 4 is a schematic circuit diagram of apparatus for controlling the temperature and humidity of the air in the processing chamber.

FIG. 5 is a fragmentary perspective view on an enlarged scale, particularly illustrating the nozzle forming flow member mounting in the apparatus.

FIG. 6 is a fragmentary view illustrating an additional embodiment of this invention wherein dry heating is used for conditioning the skin surface of the bird.

FIG. 7 is a fragmentary view of a further additional embodiment of this invention wherein pumps are used for spraying water onto the bird carcass.

Referring to the drawings in more detail:

The reference numeral 1 generally indicated poultry processing apparatus embodying this invention. In the illustrated example, the apparatus 1 includes a bleed tunnel 2 through which the birds pass on an elongated suspension conveyor 3, after throat slitting, a conditioning chamber 4 which receives the birds from the bleed tunnel 2 and a plucking tunnel 5 which encases the usual plucking machinery (not shown) for plucking the birds received from the conditioning chamber, 4. The bleed tunnel 2 and plucking tunnel 5 are located at opposite ends of the conditioning chamber 4 and contain suitable conventional air heating apparatus (not shown) for maintaining body warmth during passage therethrough.

The conditioning chamber 4 comprises an elongated substantially enclosed housing 6 having side walls 7 and 8, top and bottom walls 9 and 10 respectively and front and rear end walls 11 and 12 respectively forming an elongated chamber 13 therebetween. The walls 7, 8, 9 and 10 have suitable insulation 14 thereon to prevent substantial heat loss therethrough.

The end walls 11 and 12 respectively have spaced pairs of flapper doors 15 and 16 associated therewith forming air lock means for permitting entrance into and exit from the chamber 13 without substantial air or sprayed water leakage therefrom. The suspension conveyor 3 extends longitudinally of the housing 6 and is adapted to transport poultry 17 over a path designated by the broken lines 18 extending longitudinally and generally centrally of the chamber 13 while the poultry are maintained inverted and in spaced relation. A section 19 of the conveyor 3 is hinged at 20 and 21 and suitably suspended by perforated support rods 22 and 23. The section 19 is suitably adjustable along the length of the support rods 22 and 23 to vary the inclination of the section of track 19 for reasons hereinafter apparent.

A plurality of blowers 24 are maintained adjacent the bottom wall 10 and spaced longitudinally along the chamber 13. The blowers 24 are powered by suitable electric motors 25 and have intake ports 26, in the illustrated example located directly below the conveyor track section 19, and exhaust ports 27 and 28 opening laterally therefrom toward the respective side walls 7 and 8. As described more fully hereinafter, the blowers 24 are adapted to rapidly circulate the air contained in the chamber 13 laterally outwardly toward the side walls 7 and 8, then upwardly adjacent said side walls and then downwardly centrally of the chamber, as indicated by the flow arrows 29.

A pair of facing elongated flow directing members 30 and 30' extend longitudinally within the housing 6 and are spaced apart on opposite sides of the path 18. The flow directing members 30 and 30' are each mounted at opposite ends thereof on adjustable mounting brackets 31 for rendering said members variably adjustable in distance from each other for selectively varying the horizontal width therebetween. The mounting brackets 31 are supported by means of suitable structural members 32 by which they are located deep within the chamber 13. Referring to FIG. 5, the mounting brackets 31 each comprise a plate 33 having a plurality of spaced threaded bores 34 located in rows extending transversely of the housing 6 and adapted to receive suitable bolts 35 extending through ears 36 for bolting down a receiver 37. The receiver 37 is an elongated hollow structural member having a slot 38 extending across the upper surface thereof and curved on a radius originating at the longitudinal center of the respective flow directing member. A T-bolt 39 is received in the elongated slot 38 and bears on the upper inside surface of the receiver 37. A nut 40 is threaded on the T-bolt 39 and bears against the upper surface of the receiver 37 for clamping the T-bolt 39 in an upwardly extending position along the elongated slot 38. It is to be understood that the flow directing members 30 and 30' may be adjusted toward and away from each other symmetrically with respect to path 18, moving the respective receivers 37 along the paths of the bores 34, thus receiving the desired distance between the flow directing members without altering the angular relationship therebetween. If, in addition, it is desired to change the taper or angular relationship between the flow directing members 30 and 30' for reasons appearing hereinafter, the respective nuts 40 are loosened and the flow directing members 30 and 30' may be changed in angular relation with respect to each other about the longitudinal centers thereof indicated respectively at 41 and 42, FIG. 1.

The flow directing members 30 and 30' form therebetween an elongated down draft flow passageway 43 coinciding with the path 18. The flow directing members 30 and 30' have curved facing surfaces 44 and 45 respectively whereby the flow passageway 43 is first downwardly converging at 46 and then downwardly diverging at 47 forming an elongated nozzle throat 48. The throat 48 accelerates the flow of air therethrough induced by the blowers 24 and thereby lowers the pressure therein when the blowers are in operation.

Referring to FIG. 1, the curved facing surfaces 44 and 45 respectively of the flow directing members 30 and 30' have a plan profile 49 which slopes rapidly outwardly at 50 and then gradually inwardly at 51, causing the nozzle throat 48 to vary in horizontal width as it extends reawardly of the chamber 13.

The nozzle throat 48 and the inclined section of track 19 slope vertically away from each other as they extend rearwardly of the chamber 13. In the illustrated example, this is accomplished by sloping the section of track 19 upwardly while the throat 48 remains horizontal. The support rods 22 and 23, as noted above, permit the section of track 19 to be altered in inclination and thus the slope between the nozzle throat and the conveyor section of track 19 may be varied.

A pair of troughs 52 and 53 adapted to contain water are located respectively between the side walls 7 and 8 and the respective flow directing members 30 and 30'. The troughs 52 and 53 are preferably secured to the rear sides 54 and 55 respectively of the flow directing members 30 and 30' and extend therealong substantially the entire length thereof. Spaced open ended tubes 56 terminate at one end thereof in the troughs 52 and 53 and at the other end thereof in spray nozzles 57 communicating with and directed into and spaced along the nozzle throat 48 on both sides thereof. Suitable heating elements, in the illustrated example, steam tubes 58, maintain water 59 in the troughs 52 and 53 at the desired temperature for scalding the birds as hereinafter described. A source of water is introduced through inlet tubes 60 for maintaining water in the troughs 52 and 53 and suitable float valves 61 maintain the water 59 at a level above the inlet end of the tubes 56.

Heating elements in the illustrated example, steam tubes 62, extend longitudinally within the chamber 13 and are located adjacent the respective blower exhaust ports 27. Drip tubes 63 are adapted to drip water over spaced staggered slats 64 to present large wet surfaces 64' in the path of the air flow to moisture-saturate the air in the chamber 13, while it is heated to a poultry body maintaining temperature by the steam tubes 62.

A suitable temperature indicator and control 65 and humidity indicator and control 66 have sensitive elements extending into the chamber 13 and are adapted, in conjunction with a suitable control box 67, to operate solenoid valves 68 and 68' for respectively controlling the quantity of steam in the heating tubes 62 and water dripping from the tubes 63. Similar temperature indicating and control devices 69 are adapted to sense water temperature and control the steam in the tubes 58 for heating the trough water 59.

Suitable drip pans 70 are located beneath the steam tubes 62 to catch overflow and further present an additional water surface for evaporation to increase the humidity in the chamber 13.

Baffle plates 71 and 72 are spaced apart and slope downwardly outwardly to permit air flow therearound with little restriction but direct liquids falling thereon outwardly toward the outer edges 73 of the lower plate 72. The liquid is directed from the edges 73 through openings 74 in wall plates 75 and into troughs 76 from which the liquids are drained into tanks 77 from which they may be either passed into sewers or reclaimed and recirculated by conventional apparatus into the troughs 52 and 53.

Additional baffle plates 78 which are secured to and extending from the top wall 9 direct the air in the chamber 13 in a smooth path around the upper edges of the flow directing members 30 and 30'. Flexible sealing flaps 79 are secured adjacent the lower edges of the flow directing members 30 and 30' and rest against upper horizontal portions of the wall plates 75 to prevent a short circuit air flow back into the intake ports 27 of the blowers 24 without traveling through the nozzle throat 48.

By way of operation, poultry is first hung inverted by the feet on the suspension conveyor and the throats thereof are cut with care being taken not to sever the spinal cord which would immediately stop heart action and prevent efficient evacuation of blood from the bird. The birds travel in closely spaced relation as indicated in FIG. 3 and the major portion of blood is permitted to drain out in the bleed tunnel 2, the birds remaining in said bleed tunnel for a period of approximately one-half to one and one-half minutes, a much shorter bleed time being permissible before scalding than with conventional tank scalding methods due to the reduced danger of water aspiration. As noted above, the bleed tunnel 2 is maintained suitably heated to prevent loss of body temperature during the bleeding period. With the greater portion of the blood having been removed from the birds, they move in a continuous action through the flapper doors 15 into the chamber 13. The over-all inverted length of the particular birds being processed is noted and the inclination of the track 19 is set whereby the birds will travel through the nozzle throat 48 progressively over their entire length starting, in the illustrated example, from the feet thereof and ending at the head zone thereof, when the rear of the chamber 13 has been reached. It is to be understood that the progression through the nozzle throat maybe reversed, that is, from the head zone to the feet, if desired, by reversing the track inclination. The body profile of the bird is also noted and the flow directing members 30 and 30′ are adjusted in distance apart and in taper or angle with respect to each other so that a substantially constant and efficient area of flow is provided in the nozzle throat 48 regardless of the portion of the bird in the nozzle at any instant, that is, the widest part of the bird will coincide with the widest separation between the flow directing members.

As the birds travel in the inverted state through the nozzle throat 48, the feathers thereof, which grow rearwardly and downwardly with respect to the birds, are upset outwardly of the birds by the down draft of moist heated air which exposes and prepares the skin for efficient scalding and maintains desired body temperature. The drop in pressure in the nozzle throat 48 causes heated water to be discharged through the nozzles 58 onto the birds for scalding and, in addition, the lowered pressure in the nozzle throat 48 progressively promotes the evacuation of the remaining blood from the birds. The progressive spraying permits the apparatus to handle the birds more gently than the common total liquid submersion tank scalding apparatus. The birds pass from the chamber 13 into the plucking tunnel 5.

In some communities, and particularly in Europe, it is often preferred that poultry be plucked and packaged in the dry state. Referring to FIG. 6, an additional embodiment of this invention is shown wherein dry heating rods 81 may be placed in the nozzle throat 82 for heating the skin surface of the bird while air flows rapidly downwardly through the throat 82 for upsetting the feathers and exposing the skin, in the manner noted above. The dry heating rods 81 may take the form of electrical resistance rods for infra-red heating, or such rods may act as carriers of high frequency electrical power for inducing alternating current in the skin of the birds and thereby heating same. The controlled heating of the skin surface, as above, will permit the plucking of the feathers with less resistance and with less tendency for injuring the bird. In the embodiment of FIG. 6 heated but dry air is preferred in the chamber for maintaining the body temperature of the bird.

A further embodiment of this invention is illustrated in FIG. 7 wherein nozzles 83 are aimed downwardly toward the nozzle throat 84 and suitable pumps 85 force the heated water through the nozzles 83 and against the carcass of the bird. The embodiment of FIG. 7 may be desired in certain instances wherein birds having particularly heavy or fluffy feathers close to the skin thereof require high velocity water jets for efficient penetration. If desired, improved penetration can be obtained by pulsating the flow through the pumps 85 by any conventional method for periodically interrupting the spray from the nozzles 83.

It is to be understood that while certain embodiments of this invention have been illustrated and described, it is not to be limited to the specific forms or arrangement of parts herein described and shown except insofar as such limitations are included in the claims.

What I claim and desire to secure by Letters Patent is:

1. A poultry processing apparatus for conditioning poultry for plucking comprising an elongated housing having side walls and providing a substantially enclosed chamber therein, fluid lock entrance and exit means operatively associated with said housing permitting poultry entrance into and exit from said chamber, conveyor means associated with said housing for moving poultry in said chamber through said entrance and exit means, blower means associated with said housing for circulating a fluid therein, spaced apart flow directing members along said side walls in facing relationship for directing said fluid circulated by said blower means over said poultry, and heating means associated with said housing for heating the skin of the poultry while in said chamber.

2. The apparatus of claim 1 wherein said heating means is fluid heating means for heating said fluid circulated by said blower means.

3. The apparatus of claim 1 wherein air is the fluid circulated by said blower and including moisture saturating means associated with said housing for moisture saturating said air.

4. The apparatus of claim 1 wherein said heating means is heated water spraying apparatus adapted to spray heated water onto said skin.

5. The apparatus of claim 1 wherein said heating means is electrically powered dry heat producing means.

6. The apparatus of claim 1 including adjustable mounting brackets for said flow directing members, said brackets being adapted for rendering said flow directing members variably adjustable in distance from each other for accommodating poultry of varied size therebetween.

7. In a poultry processing system, apparatus for conditioning poultry for plucking after slitting the necks thereof comprising:
  (a) a housing having walls forming a substantially enclosed elongated chamber,
  (b) means associated with said housing to permit entrance into and exit from said chamber,
  (c) an elongated suspension conveyor extending longitudinally of said chamber and adapted to transport poultry through said entrance and exit means and over a path extending longitudinally through said chamber while said poultry are maintained inverted,
  (d) a power-driven blower operatively associated with said housing and adapted to rapidly circulate air in said chamber,
  (e) a pair of facing elongated flow directing members extending longitudinally of said chamber and spaced apart on opposite sides of said path, said flow directing members forming therebetween an elongated down draft flow passageway coinciding with said path,
  (f) said flow passageway downwardly converging and then diverging forming an elongated nozzle throat adapted for accelerating air flow therethrough and lowering pressure therein,
  (g) means for heating the air in said chamber and means for heating the skin of the poultry while in said nozzle throat,
  (h) whereby poultry traveling inverted through said chamber have the feathers thereof upset by a down draft of air to expose the skin thereof for heating and the poultry is simultaneously decompressed to promote blood evacuation from the necks thereof.

8. The apparatus of claim 7 wherein:
(a) said nozzle throat and conveyor slope vertically away from each other as they extend rearwardly of said chamber for progressively presenting said poultry in portions in said throat from the feet to the head thereof as said poultry are transported rearwardly of said chamber.

9. The apparatus of claim 7 wherein said means for heating the skin of the poultry includes:
(a) a trough containing water, means for heating water in said trough, and,
(b) spaced tubes terminating at one end thereof in said trough and at the other end thereof in spray nozzles communicating with and directed into and spaced along said nozzle throat whereby the lowered pressure in said nozzle throat causes spraying from said nozzles.

10. The apparatus of claim 8 wherein:
(a) the horizontal width of said nozzle throat varies along said path whereby substantially constant nozzle free flow area is provided about each bird regardless of the portion thereof in said nozzle throat.

11. The apparatus of claim 7 including:
(a) adjustable mounting brackets for each of said flow directing members,
(b) said brackets rendering said flow directing said members variably adjustable in distance from each other and in horizontal angular relation with respect to each other for selectively varying the horizontal width of said nozzle throat along said path to accommodate birds of various sizes and shapes.

12. In a poultry processing system, apparatus for conditioning poultry for plucking after slitting the necks thereof comprising:
(a) an elongated housing having side walls and top and bottom walls and front and rear end walls forming an elongated substantially enclosed chamber,
(b) air lock means associated with said front and rear end walls respectively to permit entrance into and exit from said chamber without substantial air leakage therefrom,
(c) an elongated suspension conveyor extending longitudinally of said housing and adapted to transport poultry over a path extending longitudinally and generally centrally of said chamber while said poultry are maintained inverted and in spaced relation,
(d) a power-driven blower operatively associated with said housing and adapted to rapidly circulate air contained in said chamber,
(e) a pair of facing elongated flow directing members extending longitudinally within said housing and spaced apart on opposite sides of said path, said flow directing members being respectively spaced from said side walls and top and bottom walls for directing air upwardly and inwardly of said chamber,
(f) said flow directing members forming therebetween and elongated down draft flow passageway coinciding with said path, said flow passageway downwardly converging and then diverging forming an elongated nozzle throat for accelerating flow therethrough and lowering pressure therein,
(g) said nozzle throat and conveyor sloping vertically away from each other as they extend rearwardly of said chamber for progressively presenting said poultry in said throat from the feet to the head thereof as said poultry are transported rearwardly of said chamber,
(h) means for heating the air in said chamber and means for heating the skin of the poultry while in said nozzle throat,
(i) whereby poultry traveling inverted through said chamber have the feathers thereof upset by a down draft of accelerated air to expose the skin thereof for heating and the lowered pressure in said throat simultaneously progressively promotes blood evacuation from the necks thereof thus preparing said poultry for plucking.

References Cited in the file of this patent

UNITED STATES PATENTS

| | | |
|---|---|---|
| 2,649,615 | Sharp | Aug. 25, 1953 |
| 2,972,167 | Roth et al. | Feb. 21, 1961 |
| 2,978,738 | Jonsson | Apr. 11, 1961 |
| 3,074,103 | Roth et al. | Jan. 22, 1963 |

FOREIGN PATENTS

| | | |
|---|---|---|
| 721,419 | Great Britain | Jan. 5, 1955 |